(12) United States Patent
Yokota

(10) Patent No.: US 7,391,544 B2
(45) Date of Patent: Jun. 24, 2008

(54) IMAGE READING APPARATUS AND IMAGE FORMING APPARATUS

(75) Inventor: Masahiko Yokota, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 526 days.

(21) Appl. No.: 11/215,973

(22) Filed: Sep. 1, 2005

(65) Prior Publication Data

US 2006/0050329 A1 Mar. 9, 2006

Related U.S. Application Data

(62) Division of application No. 09/818,582, filed on Mar. 28, 2001, now Pat. No. 7,072,082.

(30) Foreign Application Priority Data

Mar. 31, 2000 (JP) .............................. 2000-096180
Mar. 22, 2001 (JP) .............................. 2001-083304

(51) Int. Cl.
*H04N 1/04* (2006.01)
*H04N 1/36* (2006.01)

(52) U.S. Cl. ........................ 358/487; 358/474; 358/475; 358/497

(58) Field of Classification Search ................. 358/487, 358/474, 475, 497, 464, 461, 486, 494
See application file for complete search history.

(56) References Cited

U.S. PATENT DOCUMENTS

| 5,012,354 A | * | 4/1991 | Tsuchiya | 358/474 |
| 5,047,381 A | | 9/1991 | Beebe | 502/304 |
| 5,381,245 A | * | 1/1995 | Johnston et al. | 358/487 |
| 6,137,106 A | * | 10/2000 | Kao | 250/239 |

FOREIGN PATENT DOCUMENTS

| JP | 61-49920 | 3/1986 |
| JP | 61-139920 | 6/1986 |
| JP | 63-138863 | 6/1988 |
| JP | 5-43561 | 7/1993 |
| JP | 10-186535 | 7/1998 |
| JP | 3-37348 | 2/2000 |

* cited by examiner

*Primary Examiner*—Houshang Safaipour
(74) *Attorney, Agent, or Firm*—Fitzpatrick, Cella, Harper & Scinto

(57) ABSTRACT

An image reading apparatus includes an original resting glass sheet for resting allowing an original thereon, a support device for supporting an end portion of the original resting glass sheet, and a movable image reading unit for reading image information of the original, wherein the support device is provided with a cutout for preventing the support device from coming into contact with the image reading unit when the image reading unit moves outwardly beyond the end portion of the original resting glass sheet.

7 Claims, 8 Drawing Sheets

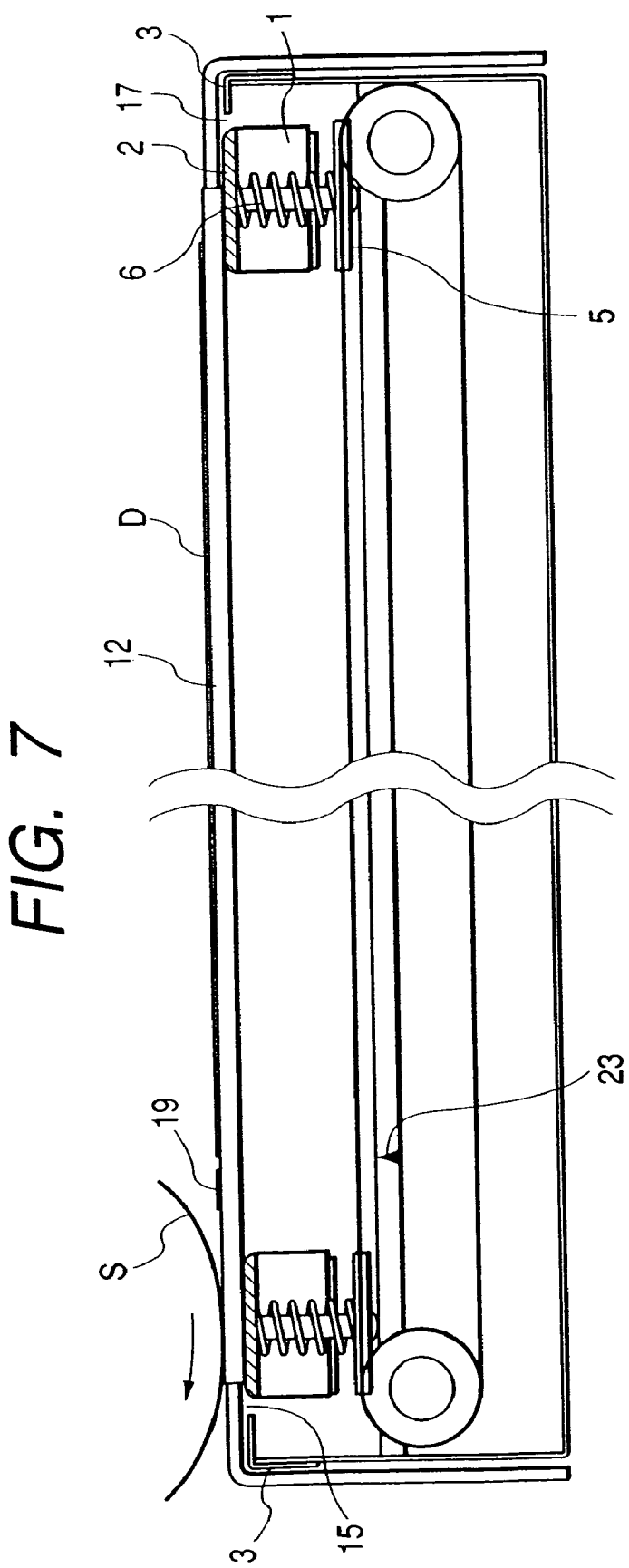

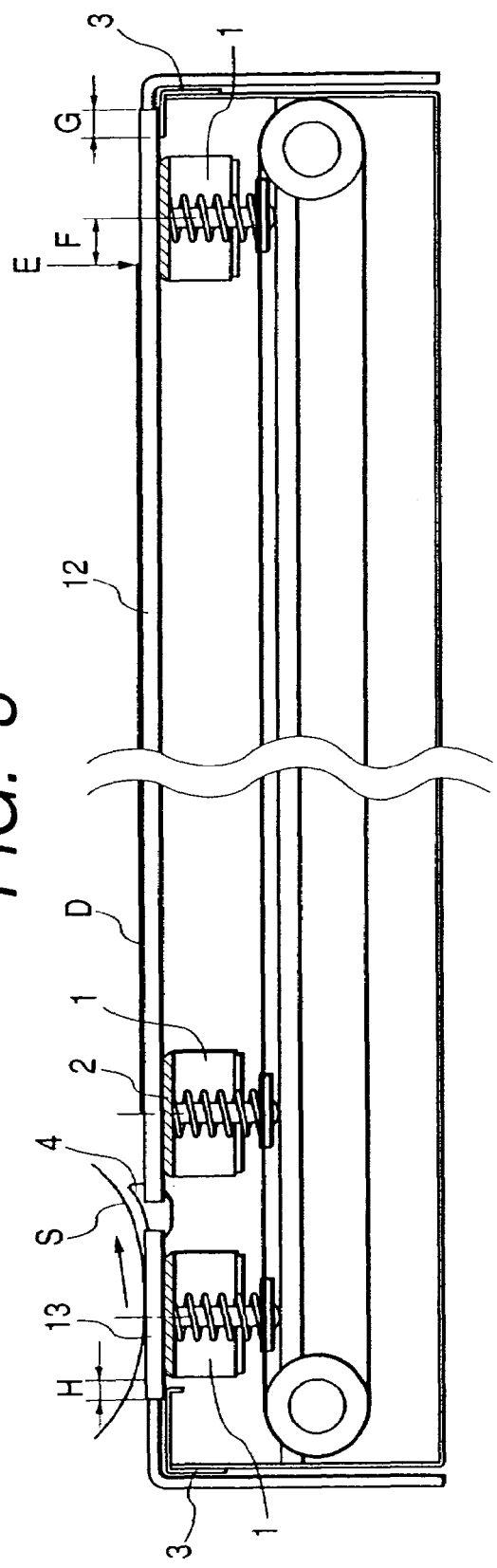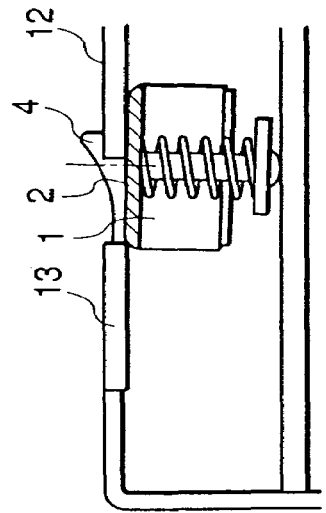

IMAGE READING APPARATUS AND IMAGE FORMING APPARATUS

This application is a divisional of U.S. patent application Ser. No. 09/818,582, filed Mar. 28, 2001, now U.S. Pat. No. 7,072,082.

BACKGROUND OF THE INVENTION

1. Field of the Invention

The present invention relates to an image reading apparatus for reading image information of originals, for example, an image reading apparatus, such as an image scanner or a facsimile apparatus. The present invention also relates to an image forming apparatus, such as a copying machine, in which the image reading apparatus is mounted.

2. Related Background Art

Conventionally, as copying machines, composite machines having a copying function and a facsimile function, and image scanners having an auto document feeder (hereinafter referred to as ADF), there have been proposed a number of apparatuses having both the function by which scanning is performed with the original remaining stationary on a glass sheet surface and the function (flow reading function) by which scanning is performed while moving the original with the optical system being stationary.

Regarding the construction of the portion in which the flow reading of originals is performed, various proposals have been made in connection with the ensuring of the reading position, the conveying of originals, etc.

For example, Japanese Patent Publication (Kokoku) No. 3-37348 proposes a construction in which an ADF is secured to the apparatus main body, with the ADF being separated from an original pressure plate, and in which the height of the reading position using the original glass stand is made the same as the height of the position at which the original fed by the ADF is read.

Further, Japanese Utility Model Publication (Kokoku) No. 5-43561 discloses a construction in which there is provided a presser member for defining a fixed gap between a contact-type image sensor (hereinafter referred to as CIS) and an original pressure roller opposed thereto to ensure a focal distance.

Further, Japanese Patent application Laid-Open (Kokai) No. 63-138863 discloses a construction in which a U-turn-conveyed original is read, and then conveyed in a discharge direction by way of a jump member by a guide member biased toward a glass sheet surface.

Japanese Patent application Laid-Open (Kokai) No. 61-139920 proposes an apparatus in which, to maintain a fixed distance between a stationary original glass stand and an optical system moving in a sub-scanning direction, a roller protrudes from the optical system toward the back surface of the original glass stand and a biasing effect is provided, thereby maintaining a fixed focal distance in conformity with the configuration of the original glass stand.

Japanese Patent application Laid-Open (Kokai) No. 10-186535 discloses an apparatus in which, as shown in FIG. 8, a stationary original D on a first glass sheet 12 is read while moving a CIS 1 as image reading means in the sub-scanning direction and in which, on a second glass sheet 13, the CIS 1 remains stationary and reads a moving original S.

In the above-mentioned invention, however, when the maximum-size original D is read on the first glass sheet 12, the CIS 1, after leaving the trailing end E of the original, undergoes speed reduction and advances by a distance F of approximately 10 mm before it stops.

In the above-mentioned conventional techniques, the sheet scanner portion which reads the original S while moving the original and the flat bed scanner portion which reads the original D arranged on the original glass stand, are respectively secured to the main body, so that, to form an image reading apparatus using a contact-type image sensor (CIS) of a shallow focal depth, the following problems are involved.

In the construction proposed in Japanese Patent Publication No. 3-37348, the optical system is scanned in accordance with the structure of the main body, and the glass sheet of the sheet scanner portion and the glass sheet of the flat bed scanner portion are separated and respectively fixed in position.

Thus, in an apparatus utilizing a CIS, it is necessary to set the heights of the two glass sheets with high accuracy to guide the original within the focal depth of the CIS. Furthermore, taking into account the construction from the sensor to the glass sheets and the number of parts, it is difficult to ensure an accuracy which meets a desired level. To ensure such accuracy, it is necessary to perform height adjustment on the glass sheets or the optical system in the assembly step.

Further, since the ADF portion is secured to the apparatus main body in a state in which the ADF portion is separated from the pressure plate, the original supply portion is arranged outside the pressure plate, so that the size of the entire main body is rather large as compared with an apparatus in which the original supply portion is provided on the pressure plate.

In the case of the proposal made in Japanese Patent application Laid-Open No. 63-138863, there is provided a jump stand 4 (FIG. 8) for picking up an original that has undergone a U-turn and has been read. When the glass sheet on the sheet scanner side and the glass sheet on the flat bed scanner side are integrated, it is necessary, in order to pick up the original by the jump stand 4, to arrange the side of the jump stand 4 which first comes into contact with the original (the upstream side with respect to the original conveying direction) lower than the glass sheet surface. Otherwise, original jamming will be caused by the edge of the jump stand 4.

On the other hand, when the upstream side of the jump stand 4 is arranged lower than the glass sheet surface, it is necessary to provide a groove in the glass sheet surface.

Provision of a groove in the glass sheet leads to a substantial increase in cost. Further, it also involves an extreme deterioration in the strength of the portion where the groove is provided.

Unlike the apparatus as disclosed in Japanese Patent application Laid-Open No. 63-138863, in which the glass sheet of the sheet scanner portion and the glass sheet of the flat bed scanner portion are integrated, a construction in which the glasses are separated as in the case of the proposal made in Japanese Patent Application Laid-Open No. 61-49920 has a problem in that the focal distance is small and, in an apparatus using a CIS in which the distance to the back surface of the glass sheet is approximately 1 mm, the glass sheet support portion and a step portion between the glass sheets are in the way, making it difficult to move the CIS between the sheet scanner portion and the flat bed scanner portion.

In the case of the proposal made in the Japanese Patent application Laid-Open No. 10-186535, the CIS 1 moves while making a vertical movement between the first glass sheet 12 and the second glass sheet 13, and the problem of the movement between the two glass sheets is solved up to a point. However, it is necessary to cause the CIS to move by a great distance in the sub-scanning direction.

FIG. 8 shows a second embodiment of the above-mentioned conventional technique, in which the support portion between the glass sheets 12 and 13 is formed by a step of 0.5 mm having a slope, and the CIS 1 held in contact with the glass sheets by a roller is moved. In the case of a glass sheet of a large size, such as an A-3 size, a problem in terms of strength is involved when supporting the glass sheet with a step of 0.5 mm.

FIG. 9 shows a third embodiment of Japanese Patent application Laid-Open No. 10-186535, in which the support portion between the glass sheets 12, 13 is flush with the glass sheet surfaces only in the portion in which the CIS 1 moves while being in contact with the glass sheets 12, 13. In this construction, the glass sheet edge portion may collide with the contact member 2 of the CIS 1, in which case the contact member 2 is worn, resulting in a change in the focal distance of the CIS 1.

Apart from this, although not explicitly proposed as an invention, in the conventional construction of FIG. 8 there is provided a speed reduction range F of approximately 10 mm to the right of the right-hand end E of the original D, and, further on the outside thereof, there exists an extra portion G of approximately 7 mm at which the frame 3 supports the end portion of the first glass sheet 12.

Further, to the left of the second glass sheet 13, there exists a portion H (having a length of approximately 5 mm) supported by the frame 3, with the result that the apparatus is rather long.

In the apparatus shown in FIG. 9, in which the distance between the first glass sheet 12 and the second glass sheet 13 is large, there is the possibility of the CIS 1 being thrust into the gap therebetween in an inclined state.

SUMMARY OF THE INVENTION

It is an object of the present invention to provide a high-performance image reading apparatus and image forming apparatus in which a reduction in apparatus size is possible.

BRIEF DESCRIPTION OF THE DRAWINGS

FIG. 7 is a front sectional view showing an image reading apparatus according to another embodiment of the present invention;

FIG. 8 is a front sectional view showing a conventional image reading apparatus; and FIG. 9 is an enlarged view showing a conventional image reading apparatus.

DESCRIPTION OF THE PREFERRED EMBODIMENTS

Preferred embodiments of this invention will now be described in detail with reference to the drawings. The sizes, materials, configurations, positional relationship, etc. of the components given in the following description should not be construed restrictively unless particularly specified.

Figure 1:
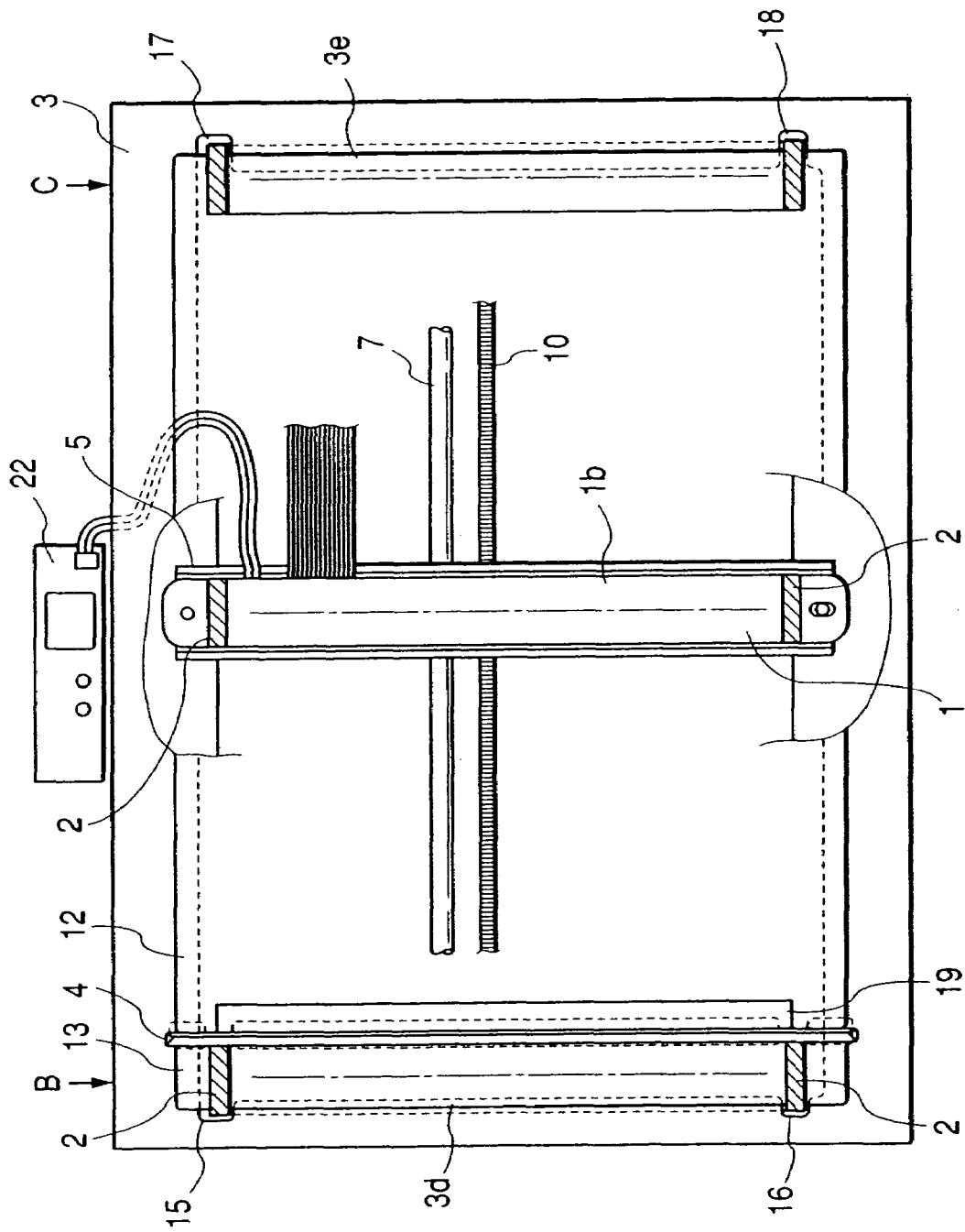
FIG. 1 is a plan view showing an image reading apparatus according to an embodiment of the present invention.
Figure 4:
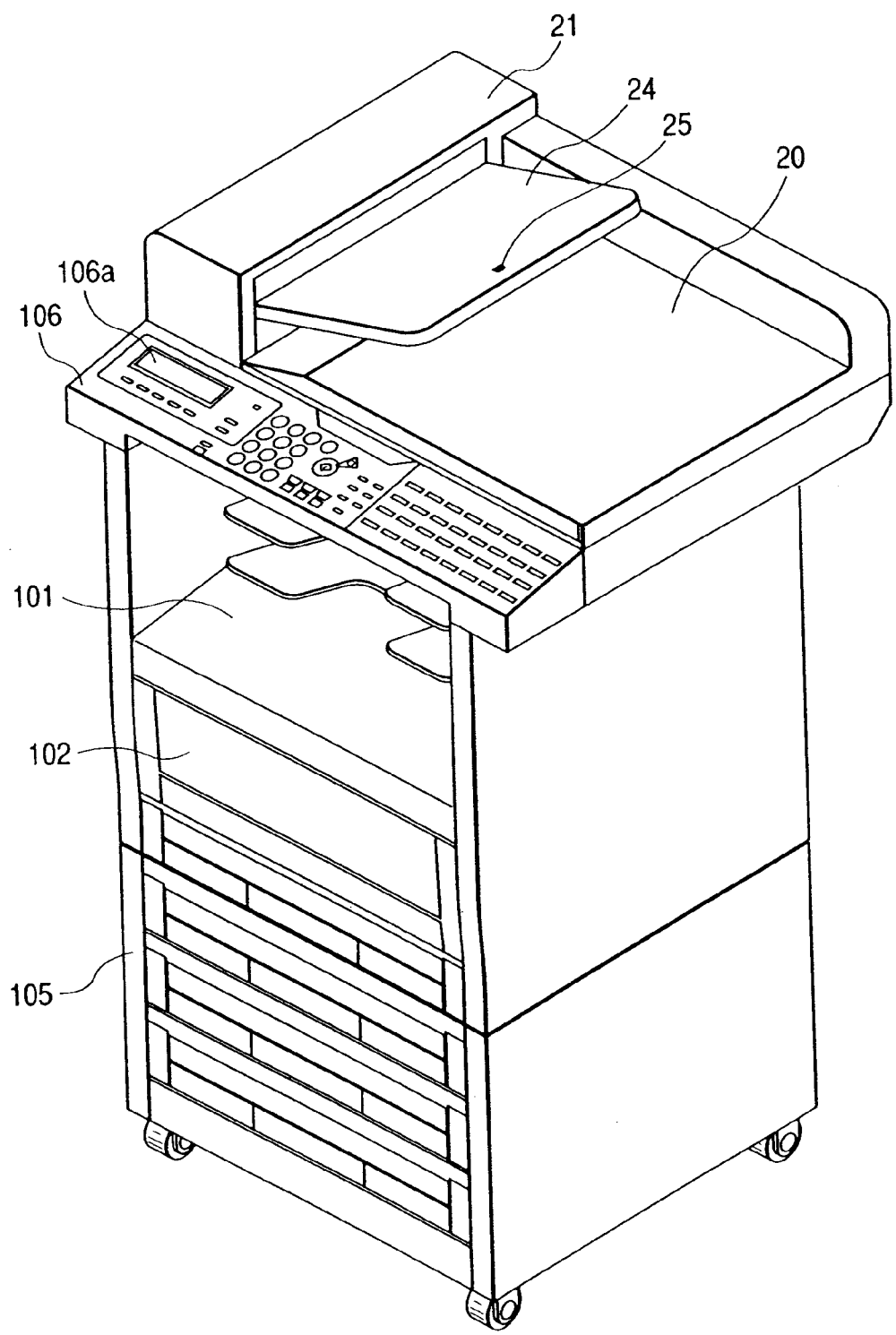
FIG. 4 is a perspective view showing a copying machine in which an image reading apparatus according to the embodiment of FIG. 1 is mounted.
Figure 5:
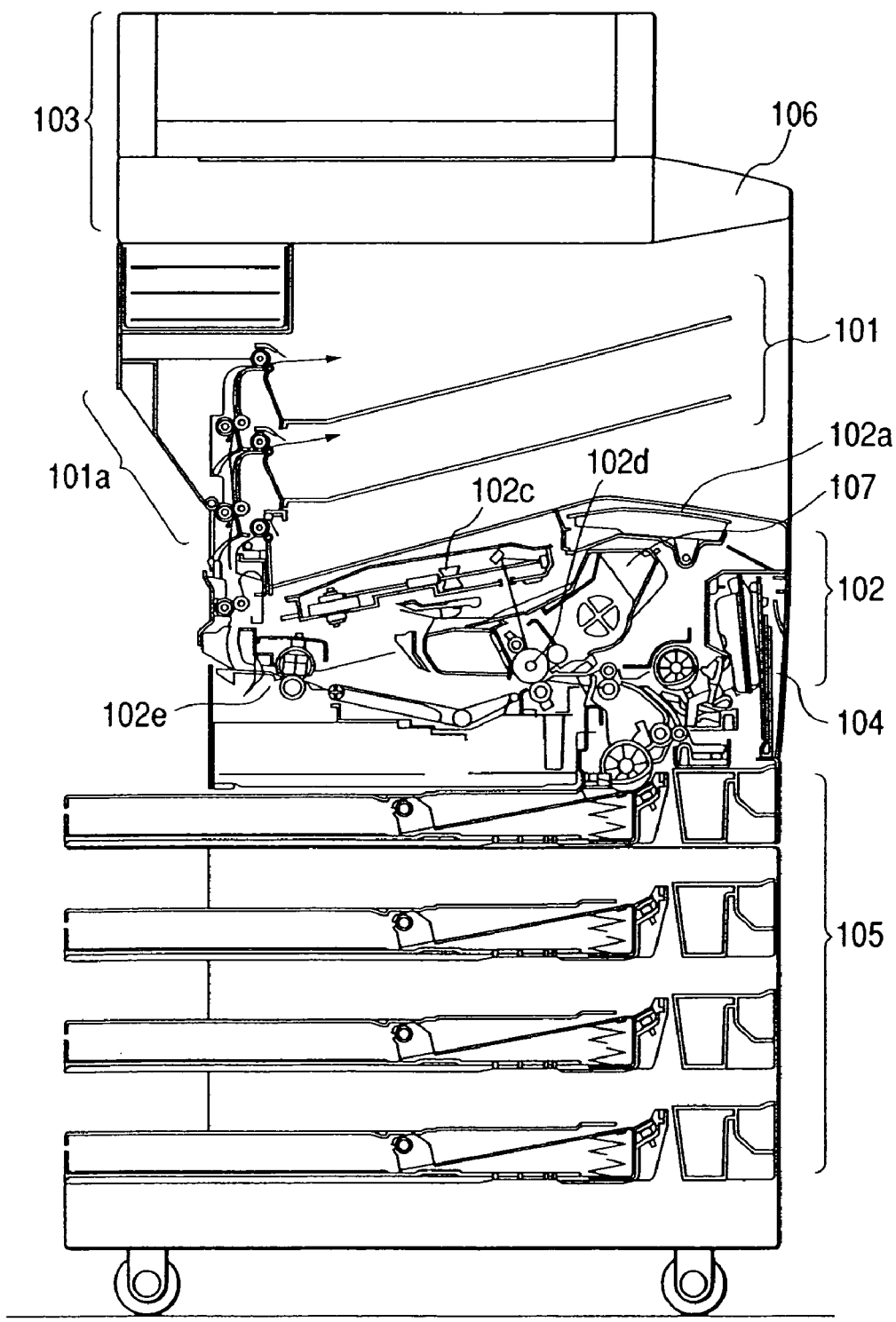
FIG. 5 is a left-hand side sectional view of the copying machine in which the image reading apparatus of the embodiment of FIG. 1 is mounted.
Figure 6:
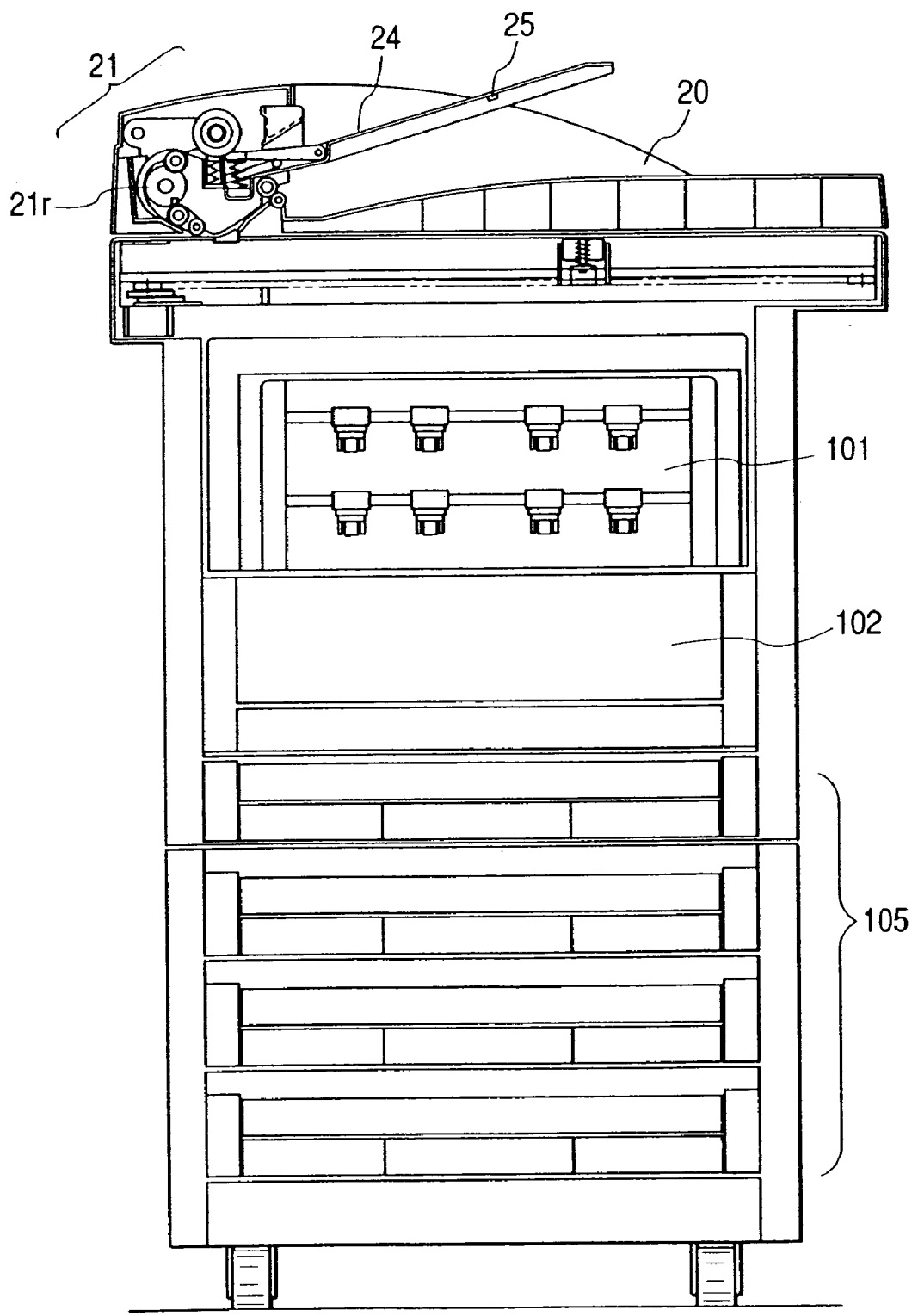
FIG. 6 is a right-hand side sectional view of the copying machine in which the image reading apparatus of the embodiment of FIG. 1 is mounted.

An embodiment of the present invention will be described with reference to FIGS. 1 through 7. FIG. 1 is a perspective view of a planar scanning device (hereinafter referred to as "flat bed scanner") according to an embodiment of the present invention in which an optical system unit (image reading unit) is mounted, FIG. 2 is a front sectional view of the flat bed scanner, FIG. 3 is a right-hand sectional view of the flat bed scanner, and FIGS. 4 through 6 are diagrams showing an image forming apparatus in which the flat bed scanner is mounted.

Figure 2:
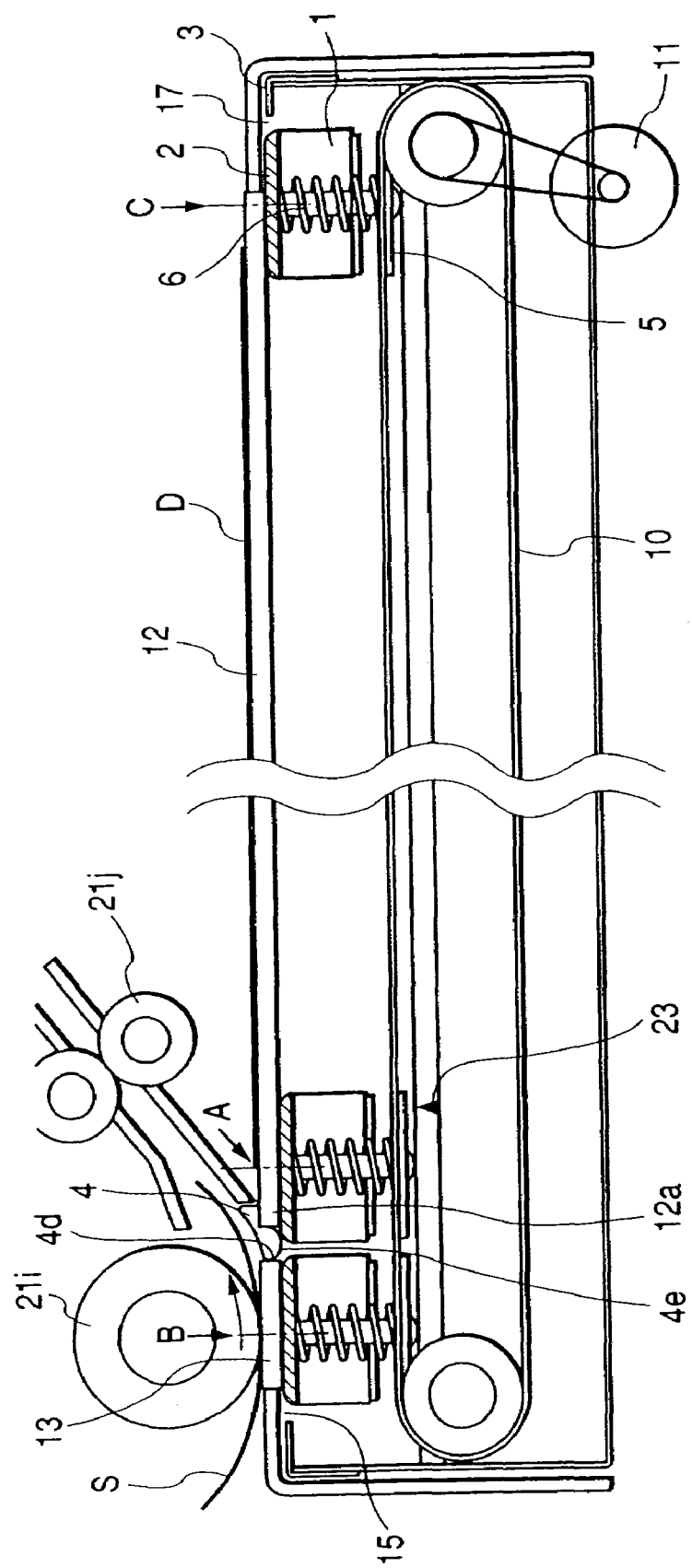
FIG. 2 is a front sectional view of the image reading apparatus of the embodiment of FIG. 1.
Figure 3:
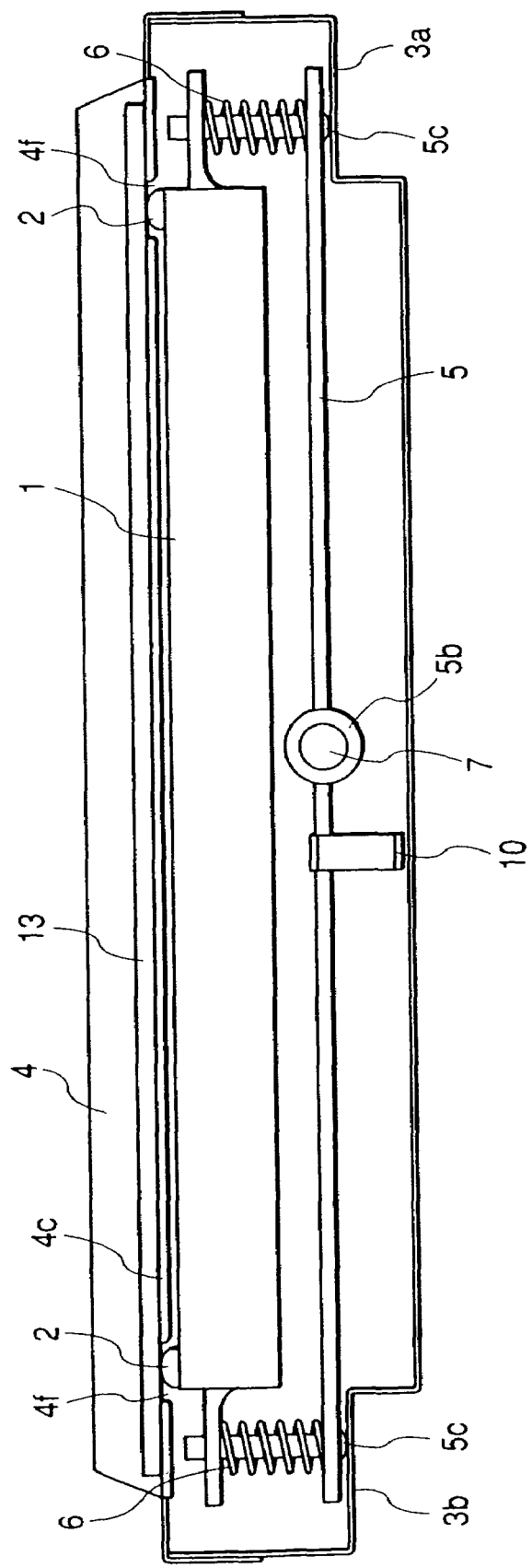
FIG. 3 is a right-hand side sectional view of the image reading apparatus of the embodiment of FIG. 1.

In FIGS. 1 through 3, numeral 1 indicates a contact-type image sensor (hereinafter referred to as CIS) serving as an image reading means, in which a long-focus SELFOC lens (trademark) (not shown) is provided. It is set so as to focus on an original glass stand 12 having a thickness of 4 mm and serving as a first light transmitting member.

Further, in the CIS 1, there is provided a cold cathode tube (Xe-tube) (not shown), making it possible to perform a long-focus, high-speed scanning of up to approximately 0.4 msec/line in the main scanning direction. The cold cathode tube is controlled by an inverter circuit 22 provided outside the CIS 1.

Numeral 12 indicates the original glass stand, which serves as the original resting means. A pair of height regulating portions 2 serve as regulating means and are formed of a material providing slidability. The height regulating portions 2 are arranged at both ends of the upper surface of the CIS 1, at positions outside the main-scanning region, which is of the width of an image readable region extending in the main scanning direction that is perpendicular to the direction in which the CIS 1 moves. The height regulating portions 2 are in contact with the back surface of the original glass stand 12 to determine the focal distance of the CIS 1.

The height regulating portions 2 are provided at outside positions with respect to the main scanning direction of the reading line 1b, and are arranged in front of the width end of the original glass stand 12 and a flow reading glass sheet 13 serving as a second light transmitting member.

This arrangement is adopted in order to prevent the read image from being adversely affected even if the portions of the lower surface of the original glass stand 12 which are in contact with the tops of the height regulating members 2 are worn to generate contact marks when the height regulating portions 2 move while in contact with the lower surface of the original glass stand 12.

A material providing slidability is selected for the height regulating members 2. In particular, it is desirable to adopt a polyacetal-based or teflon-based material, which provides a self-sliding effect.

The length of the height regulating members 2 as measured in the sub-scanning direction, in which the CIS 1 moves, is larger than double the distance between the original glass stand 12 and the flow reading glass sheet 13.

Due to this arrangement, if the image reading unit having the regulating means and the CIS 1 passes the gap between the original glass stand 12 and the flow reading glass sheet 13, it is possible to prevent a malfunction, for example, of the CIS 1 being caught by a step or the like generated between the original glass stand 12 and the flow reading glass sheet 13.

The CIS 1 is elastically supported by springs 6, which are secured to a carriage 5, so as to be upwardly biased, and held in close contact with the back surface of the original glass stand 12. Due to this construction, it is possible to eliminate factors leading to a vertical variation in the position of the CIS 1, such as the height of a guide shaft 7 and the height of a bent portion 3a of the frame 3, and to clear away the influence of a deviation in the focal distance. As a result, it is possible to design the parts with an accuracy of a general tolerance level, thereby preventing an increase in cost.

The carriage 5 is supported through a bearing 5b by the guide shaft 7 so as to be slidable with respect to the guide shaft 7. The end portions of the guide shaft 7 are secured to the frame 3 so as to horizontally support the guide shaft 7, and the frame 3 is provided with bent portions 3a, 3b extending parallel to the guide shaft 7. Sliding members 5c are brought into contact with the bent portions 3a, 3b, whereby the carriage 5 is roughly maintained in its horizontal position. When the carriage 5 moves in the sub-scanning direction along the guide shaft 7, the sliding members 5c move on the bent portions 3a, 3b while in contact therewith.

Numeral 10 indicates a timing belt for moving the carriage 5 in the sub-scanning direction, and numeral 11 indicates a stepping motor.

Referring to FIG. 4, numeral 20 indicates a pressure plate which can be opened and closed vertically. This pressure plate biases from above the sheet original D, document or the like arranged on the original glass stand 12, thereby bringing the reading image surface thereof into close contact with the original glass stand 12.

Numeral 21 indicates a sheet original conveying portion, which moves vertically with the opening and closing of the pressure plate 20. The sheet original conveying portion 21 separates a plurality of sheet originals S one by one from above, and conveys each sheet original to a sheet original reading position B shown in FIG. 2.

The sheet original reading position B is defined by the flow reading glass sheet 13 and an original backup roller 21i. The CIS 1 is moved to the sheet original reading position B and stopped there, and then the image of the original S conveyed by the sheet original conveying portion 21 is read.

An original jump stand 4 serves as a partition between the flow reading glass sheet 13 and the original glass stand 12. The original jump stand 4 constitutes a structure with a glass support portion 4c serving as support means (See FIG. 3) for clenching the original glass stand 12 bilaterally from above and below.

The glass support portion 4c also supports the lower surface of the flow reading glass sheet 13, downwardly regulating the position of the flow reading glass sheet 13. The thickness of the upstream-side end portion 4d of the original jump stand 4 is set to be smaller than the thickness of the flow reading glass sheet 13, and the leading end of the original is picked up by the original jump stand 4 to be conveyed toward discharge rollers 21j.

The portions of the jump stand 4 through which the height regulating portions 2 pass have no glass support portion 4c (to define recesses 4f), so that the image reading unit can smoothly reciprocate between the original glass stand 12 and the flow reading glass sheet 13.

A protrusion 4e on the lower surface of the jump stand 4, provided in the region through which the height regulating portions 2 pass, is formed so as to be flush with or somewhat protruding beyond the glass back surface, whereby the height regulating portions 2 are prevented from colliding with the protrusions 4e on the lower surface of the jump stand 4 or the glass edge to thereby cause malfunction or damage.

Biasing springs 6 on the carriage 5 have a stroke not less than the protrusion amount of the protrusions 4e on the lower side of the jump stand 4 of the guide portion, and their spring constant and free height are set such that the upper portion of the CIS 1 protrudes beyond a position of the bottom surface position of the original glass stand 12 when the original glass stand 12 is removed.

Due to this arrangement, the CIS 1 is brought into contact with the glass back surface only by placing the original glass stand 12 from above, the CIS 1 is enabled to move smoothly, and it is possible to prevent the height regulating portions 2 from being worn. Further, a predetermined distance is maintained between the CIS 1 and the original glass stand 12, whereby the focal position of the CIS 1 with respect to the original is determined.

An original backup roller 21i is raised with the upward opening of the pressure plate 20 so as to be separated from the flow reading glass sheet 13, making it possible for a jammed original to be cleared away in this state.

When the pressure plate 20 comes down, the original backup roller 21i is again brought into contact with the flow reading glass sheet 13 to define the original reading position B.

In FIG. 1, when the CIS 1 is at the original flow reading position B, the width of the CIS 1 is smaller than the width of the flow reading glass sheet 13. Since the height regulating portions 2 are in contact with the back surface of the flow reading glass sheet 13, cutouts 15 and 16 are provided in some parts of the frame 3, thereby preventing the height regulating portions 2 from colliding with the frame 3. Further, the central portion of the flow reading glass sheet 13 is supported by a frame 3d.

When the original D kept at rest on the original glass stand 12 is read while moving the CIS 1 in the sub-scanning direction, the position C constitutes an extremity. At this extremity for the reading operation, there are also provided cutouts 17 and 18 in some parts of the frame 3, thereby preventing the height regulating portions 2 from colliding with the frame 3.

Next, the operation of reading the original D at rest on the original glass stand 12 will be described. When the pressure plate 20 is opened, it is detected by a pressure-plate opening/closing sensor (not shown), whereby the CIS 1 reads the back surface of a white reference plate 19 provided at the end of the upper surface of the original glass stand 12 to obtain white reference data for shading correction.

The white reference plate 19 is provided between the end 12a of the original glass stand 12 and the original-leading end position A (in FIG. 2, the position A is the forward-end position in original reading), and the home position of the CIS 1 is determined by a home position sensor (consisting of a photo interrupter) 23, thereby determining an obtained white reference data value.

This apparatus allows reading of an original of up to the LDR size (432 mm). However, since the enlargement and reduction is effected through variation in the sub-scanning speed, it is necessary to accelerate or decelerate the stepping motor 11 when the scaling factor is small. Upon receiving a signal instructing a reading of original, the CIS 1 starts to move in the sub-scanning direction from the white reference data obtention position, and starts the reading of the original from the original leading end position A.

When a large acceleration distance is required, the CIS 1 is temporarily brought back to the end on the flow reading glass sheet 13 side (at this time, the height regulating portions 2 are prevented from coming into contact with the frame 3 due to the cutouts 15 and 16), and starts to accelerate from there in the sub-scanning direction. The acceleration table is prepared such that acceleration is completed before the original leading end position A is reached.

At the moment that the CIS 1 passes the home position sensor 23, step amount counting with respect to the CIS 1 is started, and image reading is started when the CIS 1, which has attained a fixed speed, reaches the original leading end portion A.

After the reading of the original is completed, the CIS 1 is decelerated before it stops. When the amount by which the decelerating CIS 1 is allowed to go beyond the end is large, it is usually necessary to enlarge the end portion of the original glass stand 12, resulting in an increase in the apparatus size.

In the present invention, this is avoided by providing the frame 3 with cutouts 17 and 18 which allow the height regulating portions 2 to enter and stop therein. Thus, there is no need to enlarge the original glass stand 12. The end portion of the original glass stand 12 is supported from below by the frame 3e (support portion).

When the CIS 1 has stopped after deceleration, the stepping motor 11, serving as the driving means, rotates in the opposite direction, and the CIS 1 moves until it is detected by the home position sensor 23. After the detection, the stepping motor 11 is stopped, and the CIS 1 remains on standby until the next image reading operation is performed.

Next, the operation of the CIS 1 in flow reading will be described. In FIG. 4, when a batch of originals is placed on the original tray 24, an original detecting sensor 25 detects the originals, and the apparatus starts an initial setting for flow reading operation. On the main body system side, an indication is given through an indicating portion (display) 106a on an operating portion 106 to indicate that the original S is on standby, and key input operation is waited for.

When the original detecting sensor 25 is turned ON, it is determined that sheet originals S are on the original tray 24. However, when the pressure plate 20 is open by an angle larger than 15 degrees with respect to the horizontal direction, a pressure plate opening/closing sensor (not shown) detects the open state of the pressure plate 20, and gives an indication to that effect through the indicating portion 106a. When the user gives instructions for operation through key input, the operation of the sheet original conveying portion 21 is restrained, thereby preventing defective conveyance of the originals.

Only when the original detecting sensor 25 is turned ON, and the pressure plate opening/closing detecting sensor (not shown) detects the closed state of the pressure plate 20, flow reading operation at the reading position B is conducted. After the completion of the reading at the reading position B, the CIS 1 is kept on standby at that position for a fixed period of time, responding to instructions for continuous flow reading operation. When no instructions are given for next reading operation after the fixed period of time, the CIS 1 is returned to the home position.

When a predetermined period of time has elapsed after the detection of the closed state of the pressure plate 20, or when operational instructions have been given by the user through key input, the main body system performs pre-scanning on the white reference plate 19 glued to the upper surface of the original glass stand 12 by the CIS 1, and moves the carriage 5, in which the CIS 1 is mounted, to the position B, which corresponds to the flow reading position. The distance by which the carriage is moved is counted in a predetermined number of steps stored in a nonvolatile memory after the movement of the CIS 1 has been detected by the home position sensor 23.

The reason for setting the flow reading position outside the region of the original glass stand 12 is as follows. In the original conveying portion on the pressure plate 20 side, corresponding to the flow reading position, there are provided mechanism parts such as rollers and an opening for allowing sheet passage. If the flow reading position is on the original glass stand 12 side, the shadow of the opening will be read when an original of a size smaller than the recording size of the original glass stand 12 is read, with the result that the shadow of the opening of the sheet scanner portion is allowed to be recorded in a part on either side of the recorded image, resulting in a deterioration in the image quality.

When the detent torque of the stepping motor 11 is large, or when the gear ratio is large, a large braking force is applied due to the moment of inertia of the CIS 1 and the biasing force applied to the original glass stand 12, so that it is possible to set the CIS 1 at rest, without supplying a stop energization current to the stepping motor 11.

In this case, motor control is released, so that it is only necessary for the system to control the sheet scanner motor 21r (FIG. 6). That is, operation is possible by switching between the motors controlled by a single control circuit, so that the cost involved is lower as compared with the case in which two control circuits are provided.

Next, an example of a construction in which this image reading apparatus is mounted in a copying machine will be described. This copying machine is provided with a flat bed scanner which reads an original image by setting the original on the original glass stand 12 and moving the CIS 1, and a (flow reading) sheet scanner which reads an original image while conveying the original so as to bring it into contact with the flow reading glass sheet 13 arranged at substantially the same height as the original glass stand 12, instead of scanning an original conveyed to and set at rest at a predetermined position as in the case of conventional copying machines.

As shown in FIG. 5, a recording sheet discharging portion 101 is provided below the reading portion 103. Below the recording sheet discharging portion 101, there is provided a recording portion 102 (laser beam printer) which is equipped with image forming means for forming a toner image on a recording sheet consisting of paper or the like in accordance with an image signal obtained by the reading portion 103, etc. The recording portion 102 is provided with a toner-integral-type process cartridge 107.

At the front of the recording portion 102, there is provided a multi-feed portion 104 capable of feeding recording sheets of various sizes, and, in the lowermost portion, there are provided front loading cassettes 105 which can be drawn out to the front. The cassettes 105 can be provided in a plurality of stages, each cassette 105 consisting of a universal cassette allowing changes in the sizes of the recording sheets used.

The operating portion 106 and the reading portion 103, which are most frequently used by the user, are arranged at positions that are most convenient for operation, and the recording sheet discharging portion 101, whose frequency of use is next to that of the above-mentioned components, is provided below them. The toner-integral-type process cartridge 107 is arranged below the recording sheet discharging portion. Since the large-capacity cassettes 105 are arranged in the lowermost portion, the number of times that recording sheets are supplied is reduced to thereby reduce the number of times that operation is performed, and it is possible to minimize the installation space for the cassettes 105.

In this way, the operating portion 106, the original reading portion 103, the recording sheet discharging portion 101, the process cartridge 107, and the cassettes 105 are arranged from above in the order of frequency of use, thereby facilitating the operation to improve the operability.

The recording sheet discharging portion 101 is provided in the space between the recording portion 102 and the reading portion 103, the recording sheets being discharged from the back toward the front as seen by the user.

Due to this arrangement, an improvement is achieved in terms of visibility of the recording sheets as compared with the conventional lateral discharging. Since the paper feed portion 104 does not stick out, the space for installation is reduced, and the user is enabled to extract recording sheets while standing, whereby an improvement in operability, etc. is achieved.

Further, a part of the sheet discharging portion 101 constitutes a cartridge cover 102a for the toner-integral-type process cartridge 107, and the cartridge cover 102a can be opened within the space of the sheet discharging portion 101. Further, taking account of the operability of the process cartridge 107, a cartridge guide is provided in the apparatus main body such that the process cartridge can be drawn out to the front obliquely upwards.

Further, at the back of the space of the sheet discharging portion 101, there is provided a jam removal cover 101a. By opening this jam removal cover 101a to the front, the pressure of the recording sheet conveying drive system is released, and the jammed recording sheet can be drawn out to the front. In FIG. 5, numeral 102c indicates a laser optical unit for image generation, numeral 102d indicates an image transfer portion, and numeral 102e indicates a fixing portion.

As described above, in this embodiment, cutouts 15, 16, 17, 18 are provided in some parts of the frame 3 at the ends of the image reading region, and the height regulating portions 2 are prevented from colliding with the frame 3 which serves as the support portion for supporting the glass sheets 12, 13. Thus, the apparatus size can be reduced as compared with the case in which the support portions of the frame 3 supporting the end portions of the glass sheets 12, 13 are provided outside the movement region for the CIS 1. Further, since no cutout is provided between the cutouts 15, 16 or between the cutouts 17, 18, it is possible to support in a stable manner an original glass stand which is relatively heavy. Thus, it is possible to prevent generation of distortion due to insufficient support for the original glass stand by the frames, with the result that it is possible to prevent defective reading of images by the CIS 1.

FIG. 7 shows another embodiment of the present invention. As shown in FIG. 7, the sheet original S is read as it is moved. When, in this case, the sheet is conveyed toward the exterior of the apparatus from the original glass stand 12, there is no need to provide the jump stand 4 between the flow reading glass sheet 13 and the original glass stand 12, so that the two glass sheets can be integrated.

In this case, as in the above-described embodiment, there are provided the cutouts 15, 16, 17, and 18 for preventing abutment against the frame 3 of the height regulating portions 2 of the image reading unit (i.e., the height regulating portions 2 for regulating the height of the CIS 1) in the glass support portion on the right-hand end portion of the original glass stand 12.

On the other hand, due to the absence of the jump stand 4, the left-hand end portion of the original glass stand 12 is supported by the frame 3. However, it is also possible, as in the case of the flow reading glass sheet 13, to provide the cutout 15 as the escape means for the height regulating portions 2 to support the original glass stand 12.

As described above, when adopting a CIS of a shallow focal depth as the image reading means, the support means is provided with cutouts for preventing the image reading unit from abutting against the support means when the image reading unit moves outwardly beyond the end of the original resting means, whereby it is possible to move the image reading unit up to the end portion of the original resting means.

Thus, as compared with an image reading apparatus and an image forming apparatus in which the original resting means is supported by support means at positions corresponding to areas outside the movement region of the image reading unit, a reduction in apparatus size can be achieved.

What is claimed is:

1. An image reading apparatus comprising:
   an original resting member, on an upper surface of which an original is rested;
   a scanning unit which scans the original rested on said original resting member;
   a moving mechanism which moves said scanning unit in a predetermined direction along a lower surface of said original resting member;
   a regulating member which regulates a distance between said scanning unit and said original resting member by sliding on the lower surface of said original resting member when said scanning unit is moved in the predetermined direction by said moving mechanism; and
   a support member which supports the original resting member over a direction perpendicular to the predetermined direction from a side of the lower surface of said original resting member in a vicinity of an end of said apparatus,
   wherein said support member is provided with a cutout which prevents said regulating member from coming into contact with said support member when said scanning unit is moved to the vicinity of said end along the lower surface of said original resting member by said moving mechanism.

2. An image reading apparatus according to claim 1, further comprising a biasing mechanism which biases said scanning unit against said original resting member, wherein said moving mechanism moves said scanning unit in the predetermined direction along said original resting member with said scanning unit biased by said biasing mechanism.

3. An image reading apparatus according to claim 1, wherein said support member supports an end of said original resting member from the side of the lower surface of said original resting member.

4. An image reading apparatus according to claim 1, further comprising an original conveying portion which conveys the original, wherein said cutout is provided in a position for preventing said regulating member from coming into contact with said support member when said scanning unit, stopped in a predetermined position in the vicinity of said end, scans the original conveyed by said original conveying portion.

5. An image reading apparatus according to claim 1, wherein said regulating member is provided in a vicinity of each of both ends of said scanning unit in the direction perpendicular to the predetermined direction.

6. An image reading apparatus according to claim 1, wherein said original resting member is a transparent member.

7. An image reading apparatus according to claim 1, wherein said scanning unit is a contact image sensor.

* * * * *